United States Patent [19]

Nawa et al.

[11] Patent Number: 4,536,634
[45] Date of Patent: Aug. 20, 1985

[54] HOT WIRE ARC WELDING TORCH ASSEMBLY

[75] Inventors: Akiyoshi Nawa; Yoshiaki Kato, both of Nagoya, Japan

[73] Assignee: Mitsubishi Denki Kabushiki Kaisha, Tokyo, Japan

[21] Appl. No.: 453,570

[22] Filed: Dec. 27, 1982

[30] Foreign Application Priority Data

Jan. 8, 1982 [JP] Japan .................. 57-1110[U]

[51] Int. Cl.³ .............................................. B23K 9/28
[52] U.S. Cl. ...................................... 219/74; 219/136; 219/75
[58] Field of Search ............... 219/74, 75, 76.1, 76.14, 219/76.15, 121 PR, 136, 137.61, 130.01, 137.52

[56] References Cited

U.S. PATENT DOCUMENTS 3,102,947  9/1963  Blackman ............... 219/137.52
3,122,629  2/1964  Manz ........................ 219/74
3,163,743  12/1964  Wroth et al. ............ 219/137
3,940,586  2/1976  Stearn et al. ............ 219/75

Primary Examiner—Roy N. Envall, Jr.
Assistant Examiner—Catherine M. Sigda
Attorney, Agent, or Firm—Sughrue, Mion, Zinn, Macpeak and Seas

[57] ABSTRACT

A hot wire welding torch assembly includes a nonconsumable metal electrode 12, a filler metal 6 fed to a weld puddle 11 formed by an arc 10, a collet body 15 for holding the electrode, a shielding gas nozzle 3, and a torch body 1 molded from a synthetic resin for coaxially mounting the collet body and shielding gas nozzle. A highly dielectric and heat-proof insulating bushing 14 is provided between the torch body and a clamping holder 2 for mounting the torch body 1 to a filler metal torch 4 to prevent any relative slippage between the two torches and avoid electrical shock hazards.

3 Claims, 4 Drawing Figures

HOT WIRE ARC WELDING TORCH ASSEMBLY

BACKGROUND OF THE INVENTION

1. Field of the Invention

This invention relates to a hot wire arc welding torch assembly having a high dielectric resistance characteristic.

2. Description of the Prior Art

A nonconsumable metal electrode and a heated filler metal are used in a hot wire arc welding system. Gas-shielded tungsten arc hot wire welding and plasma arc hot wire welding are typical examples of such a system. A gas-shielded tungsten arc forms a weld puddle on a workpiece, and a filler metal is continuously fed into the puddle to form a weld bead. An alternating current is applied through the filler metal, with the magnitude of the current adjusted to heat the filler metal to its melting point just as it reaches the weld. The filler metal will then form a melt line just above the surface of the puddle.

U.S. Pat. Nos. 3,122,629 and 3,163,743 disclose hot wire arc welding systems which increase the deposition rate of the filler metal as compared with using a non-heated filler metal. These systems require two relatively large torches, however, one for generating the arc and another for heating the filler metal, and are therefore not well suited for manual welding.

Accordingly, in order to enable manual welding it is necessary that both torches be combined and miniatured to the extent that the resulting assembly is easily manipulable. In the past it has been proposed that the torch for heating the filler metal be disposed in parallel with a tungsten inert gas (T.I.G.) torch, with the tip of the heating torch being bent toward the T.I.G. torch.

Referring to FIG. 1 and FIG. 2, a typical conventional hot wire arc welding torch assembly is illustrated, including a T.I.G. torch 1 whose body is molded from a heat-proof synthetic resin. A tungsten electrode 12 is held by a collet body 15, which is mounted in the torch 1 such that the electrode is coaxially disposed. A holder 2 fixes the T.I.G. torch to a torch 4 for heating a filler metal 6. As shown in FIG. 2, the holder has a pinch gap 16 clamped by a bolt 13. A shielding gas nozzle 3 supplies an arc 10 and a weld puddle 11 with inert gas, and thereby shields the welding zone from the atmosphere. A rotatable knob 9 on the heating torch 4 controls the position of the filler metal 6. A power source 8 supplies the filler metal with current which flows through the weld puddle 11 and a workpiece 7. The electrical power source for establishing the plasma arc 10 is conventional, and not shown in the interest of simplicity.

Such a conventional T.I.G. torch assembly has a generally tapered shape in the area at which the holder 2 is clamped on, and in use there is a tendency for the holder to expand due to the radiant heat generated during welding. As a result the holder 2 is prone to become loose and slip, whereby the target critical welding position of the filler metal 6 is disrupted; this produces a low quality weld. If the bolt 13 is tightened in order to avoid this problem the molded T.I.G. torch body can easily be cracked and destroyed. Also, since in T.I.G. welding the arc is established by high-frequency energy, when it is difficult to initiate the arc 10 between the electrode 12 and the workpiece 7, the molded body portion of the torch induces dielectric breakdown. This causes leakage of the high-frequency energy from a contact member (not shown) in the torch to the holder 2, and may result in an electrical shock accident.

SUMMARY OF THE INVENTION

It is an object of this invention to overcome these disadvantages by providing a hot wire arc welding torch assembly wherein an insulating bushing is provided correspondingly configured to and surrounding the tapered outer surface portion of the T.I.G. torch body, and within the clamping holder. The insulating bushing has a straight cylindrical outer surface for firm and positive gripping engagement by the holder, to thereby preclude any slippage during use and attendant shock hazards.

DETAILED DESCRIPTION OF THE PREFERRED EMBODIMENT

In accordance with this invention, an insulating and axial positioning bushing is provided between the body of T.I.G. torch 1 and the holder 2, to thus prevent both heat induced slippage and electrical shock accidents.

Figure 1:
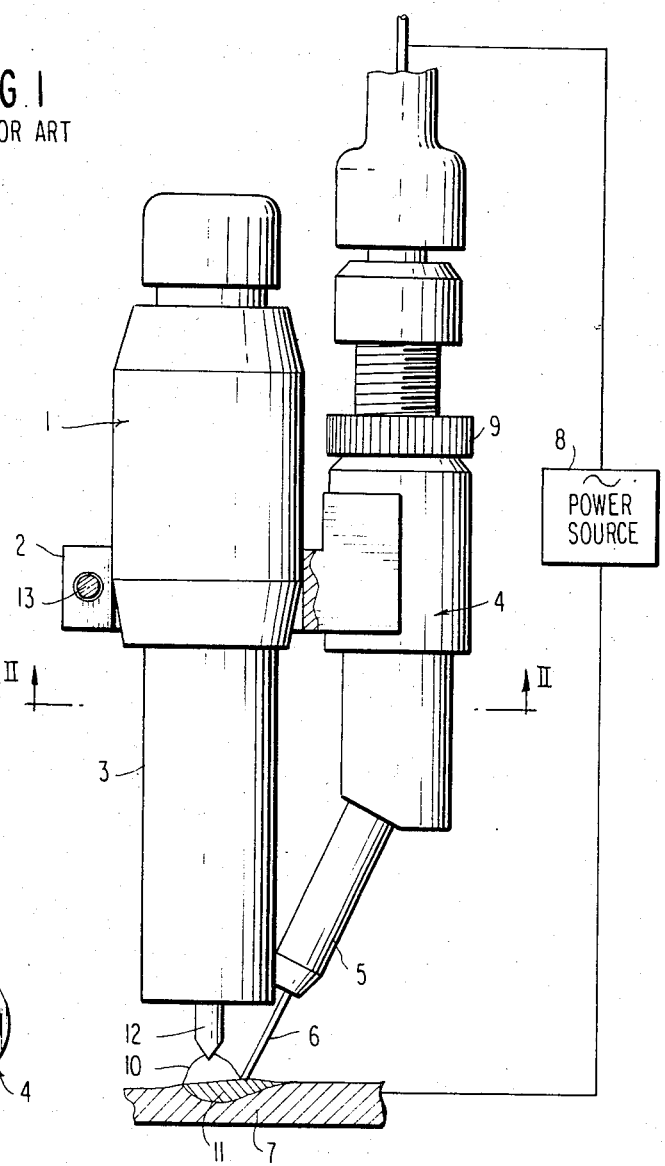
FIG. 1 is a front elevational view of a conventional hot wire arc welding torch assembly.
Figure 2:
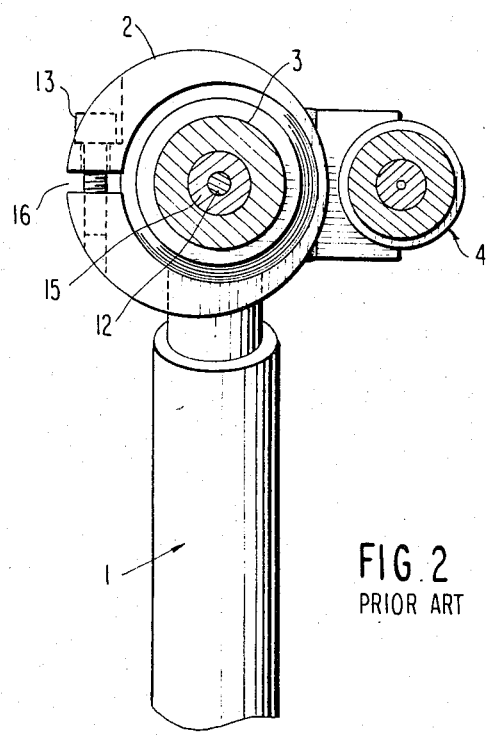
FIG. 2 is a fragmentary sectional view taken on line II—II of FIG. 1.
Figure 3:
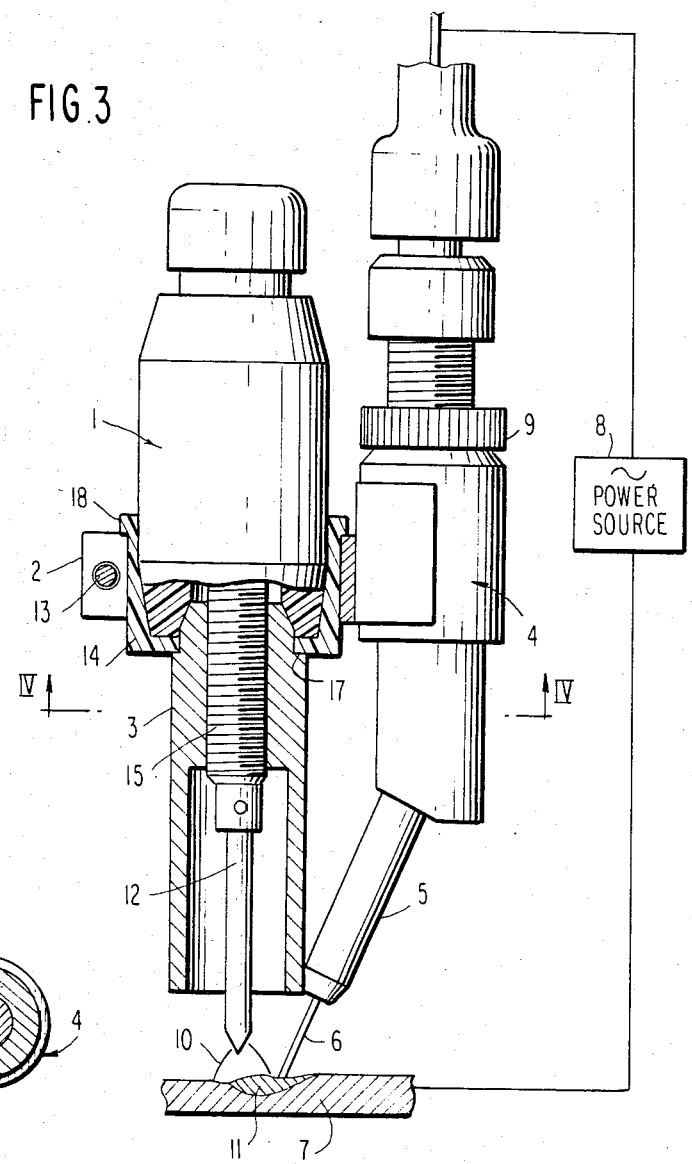
FIG. 3 is a front elevational view of a hot wire arc welding torch assembly of the present invention.
Figure 4:
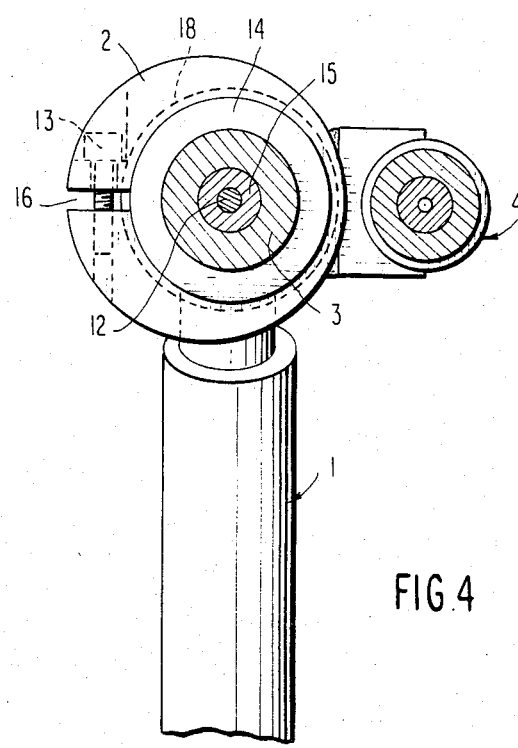
FIG. 4 is a fragmentary sectional view taken on line IV—IV of FIG. 3.

Referring to FIGS. 3 and 4, the hot wire arc welding torch assembly of this invention is substantially similar to that of the conventional construction illustrated in FIGS. 1 and 2 in respect of those structural components and elements identified by reference numerals 1 through 13, 15 and 16, whereby no further description thereof will be given.

Reference numeral 14 designates an insulating sleeve or bushing which has heat-proof and high insulation resistance characteristics, and which is made from, for example, a fluoride resin. The inner configuration of the insulating bushing has the same tapered shape as the outer surface of the body of T.I.G. torch 1. A threaded portion of the collet body 15 is screwed into the inner portion of the shielding nozzle 3. The upper portion of the nozzle 3 has a step or shoulder 17 which engages an inwardly projecting flange of the insulating bushing 14. The nozzle and insulating bushing are mounted within the body of torch 1. The holder 2 is disposed around the outer, straight cylindrical portion of the insulating bushing which has an outwardly projecting upper flange 18 which seats upon and thus accurately positions the holder 2 in relation to the torch 1 and nozzle 3. As the bolt 13 is tightened the gap 16 becomes narrower and the holder 2 is thus firmly clamped onto the body of the T.I.G. torch 1 through the insulating bushing 14.

In the preferred embodiment described above the filler metal is continuously heated. However, another torch assembly wherein a non-heated filler metal is fed to the weld puddle may also be employed while retaining the same advantageous effects of the invention.

What is claimed is:

1. A hot wire arc welding torch assembly, comprising:

(a) a non-consumable metal electrode (12), (b) a filler metal (6) electrically connected in series with and energized by a power source (8), (c) means (4) for heating said filler metal to feed a weld puddle (11) formed by an arc (10) between said electrode and a workpiece (7), (d) a collet body (15) for holding said electrode, (e) a shielding gas nozzle (3) surrounding said collet body, (f) a torch body (1) molded from a synthetic resin interiorly and centrally axially mounting said collet body and shielding gas nozzle, said torch body having an inwardly tapered outer suface at a lower end thereof, (g) an insulating bushing (14) having heat-proof and high insulation resistance characteristics, said bushing having an inner surface complementary to and surrounding the tapered outer surface of said torch body, and (h) a clamping holder (2) securely coupling said filler metal heating means with said torch body through said insulating bushing, wherein the outer surface of said insulating bushing engaged by said clamping holder has a straight cylindrical configuration, wherein said insulating bushing includes stop means (18) for engaging and fixing the position of said holder, and wherein said insulating bushing has a central lower aperture of a smaller diameter than the maximum outside diameter of said shielding gas nozzle, said central aperture being defined by an inwardly projecting flange of said bushing which engages and seats against a shoulder (17) of said nozzle.

2. The welding torch assembly according to claim 1, wherein said insulating bushing is made from a fluoride resin.

3. The welding torch assembly according to claim 1, wherein the torch body has a cylindrical outer surface portion above the inwardly tapered lower end thereof, and the insulating bushing has a complementary cylindrical inner surface portion above its tapered inner surface.

* * * * *